R. FLEMING.
PROCESS OF SMELTING ORES AND APPARATUS THEREFOR.
APPLICATION FILED MAY 23, 1910.
1,020,546.
Patented Mar. 19, 1912.
2 SHEETS—SHEET 1.
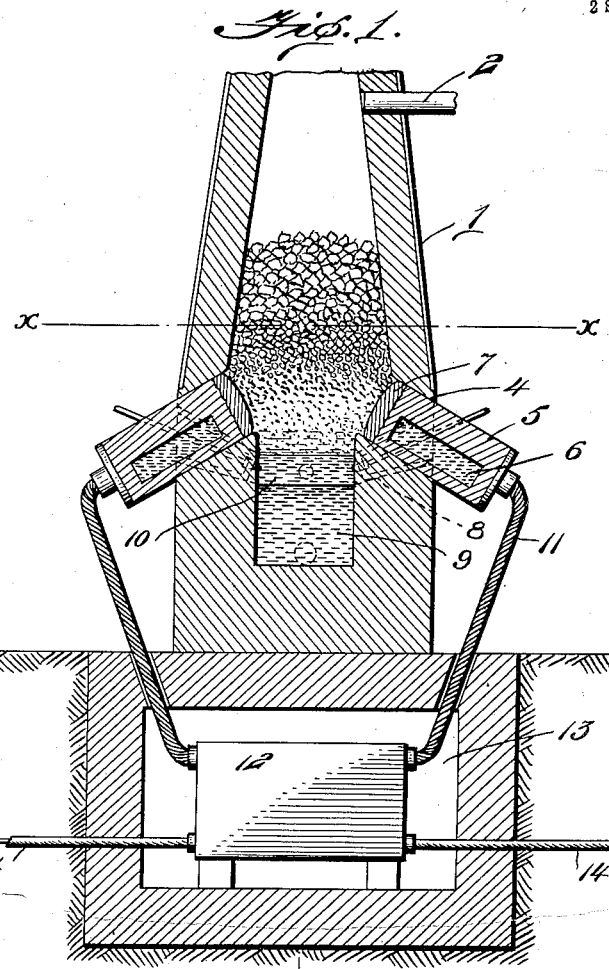
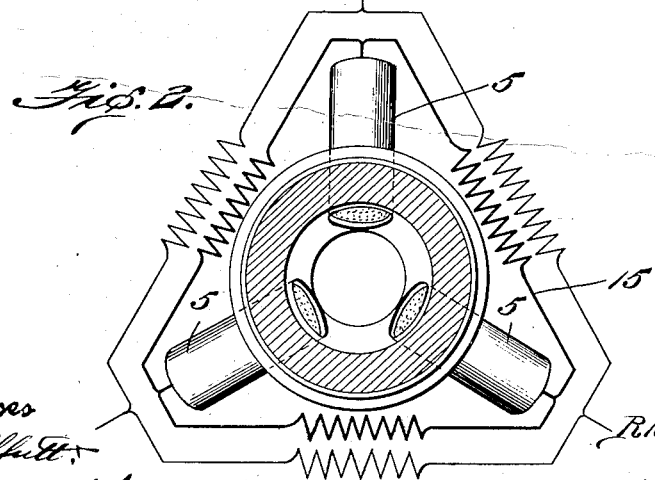
Witnesses
Inventor
Richard Fleming,
by K. P. McElroy
Attorney R. FLEMING.
PROCESS OF SMELTING ORES AND APPARATUS THEREFOR.
APPLICATION FILED MAY 23, 1910.
1,020,546.
Patented Mar. 19, 1912.
2 SHEETS—SHEET 2.
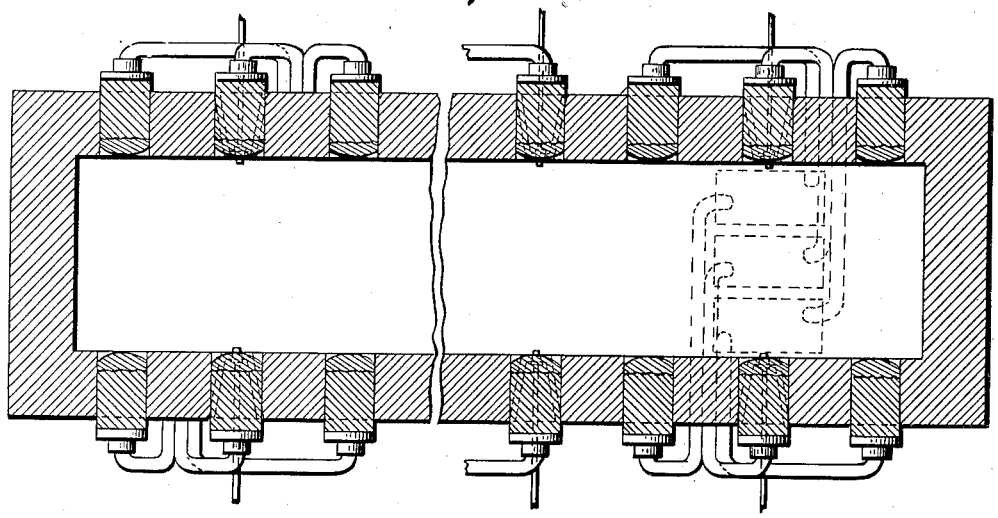
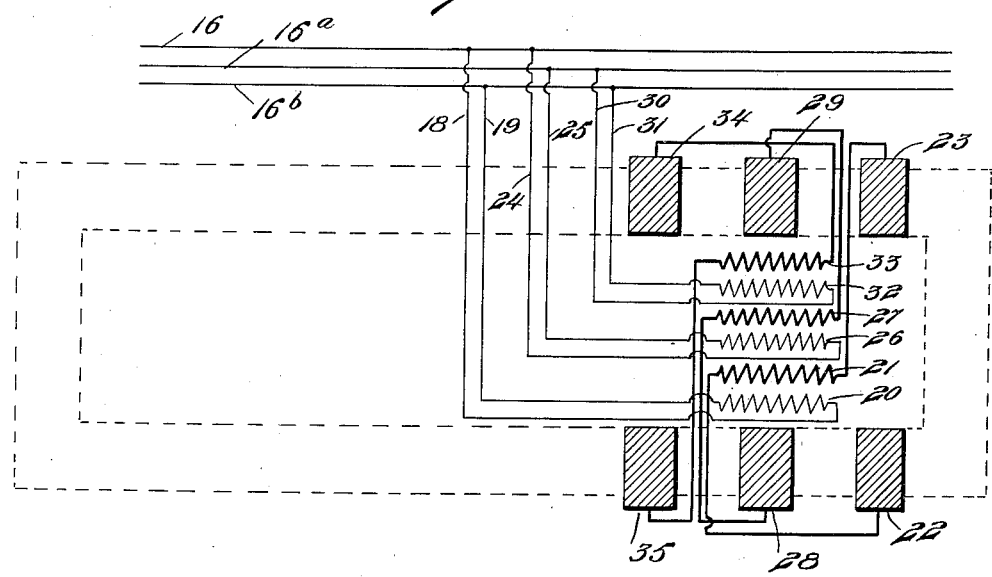

UNITED STATES PATENT OFFICE.

RICHARD FLEMING, OF WESTFIELD, NEW JERSEY.

PROCESS OF SMELTING ORES AND APPARATUS THEREFOR.

1,020,546.  Specification of Letters Patent.  Patented Mar. 19, 1912.

Application filed May 23, 1910. Serial No. 562,938.

*To all whom it may concern:*

Be it known that I, RICHARD FLEMING, a citizen of the United States, residing at 597 Highland avenue, Westfield, in the county of Union and State of New Jersey, have invented certain new and useful Improvements in Processes of Smelting Ores and Apparatus Therefor, of which the following is a specification.

This invention relates to processes of smelting ores and apparatus therefor; and it comprises a process wherein a body of material comprising an ore is fed downward in a vertical body and at the narrowest point in said body is subjected to the heating influence of transversely passing electrical currents introduced at such point from false electrodes formed from a product of such ore, said currents being of sufficient amperage to produce fusion in the charge at this point and separation of fused products therebelow; and it more particularly comprises a process of producing iron and by-products wherein a body of material comprising oxidized iron ore such as hematite and fuel is fed downward in a vertical body of different section in different planes and at the narrowest point in said body is subjected to the heating influence of electrical currents introduced at such point from false electrodes formed of reduced iron, said currents being of sufficient amperage to produce fusion at this point and separation of fused products therebelow; and it also comprises an apparatus for treating ores comprising a vertical furnace chamber having boshes, a plurality of oppositely placed electrodes located in said boshes and provided with cooling means and means for supplying alternating currents to said electrodes; all as more fully hereinafter set forth and as claimed.

In the ordinary manufacture of iron in the blast furnace a descending charge of iron ore, flux and fuel travels down a shaft furnace against an ascending blast of air. The flux, which is ordinarily largely limestone, serves to convert the fixed impurities of the ore and fuel into fusible silicates which can be removed as slag. The reactions taking place are many and diverse, but for the sake of simplicity it may be said that the combustion of the carbon furnishes the necessary high temperature to cause a reduction of iron oxid by carbon monoxid and fusion of the resultant iron, and to calcine the limestone and fuse the silicates it forms. Several times as much fuel must be employed as is theoretically necessary for the reduction of the iron and this fuel must be employed in a form which is mechanically capable of withstanding the burden of the furnace without crushing and losing porosity. This large uqantity of fuel, in turn, necessitates more flux to take care of its ash constituents. And with the large quantity of fuel comes an increase in sulfur and phosphorus; some amount of these detrimental elements being further imported by the large quantity of flux required in the usual process.

Many attempts have been made to apply electrical heating in the reduction of iron with the idea of securing a purer product and products of more definite composition than is possible under the necessarily difficultly regulable conditions of the air-blown blast furnace, but these attempts have not been as successful as could be desired; this being largely due to a desire to vary the operation to suit the exigencies of the ordinary types of electrically heated furnace rather than vary the heating means to suit the exigencies of blast furnace practice.

The shape and operation of the blast furnace have been adopted after centuries of experience and represent necessities in the reduction of the oxids of iron by carbon which are independent of the particular method of heating employed, whether this method of heating be electrical or by combustion. For successful practical reduction of iron by carbon it is better to adhere as nearly as may be to the successful type of blast furnace structure usually employed, varying it only so much as necessary to permit of electrical heating. This electrical heating must be applied at the point or zone where the maximum development of heat occurs in the ordinary blast furnace so that the thermal reactions thereabove may go on in the usual manner. This involves heating at the narrowest part of the boshes. As this represents the narrowest point in the furnace, however, the burden rests more or less vertically on the wall at this point, and this in turn involves difficulties in the maintenance of electrodes. In the present invention therefore I employ a vertical shaft furnace which may be of the ordinary type so far as the upper structure is concerned and provide it at or near the locality of restricted diameter with suitable electrodes; these electrodes being water cooled and so placed and shaped that a substantial portion of them is outside the inner surface of the furnace wall. From these electrodes I cause currents to pass through the burden transversely, forming a multiplicity of arcs thereacross between particle and particle. This causes a maximum development of heat at this point with the ordinary thermal blast furnace reactions between the charge and the furnace gases going on thereabove. No air need be introduced into the charge, though of course a small proportion may be used if so desired.

The use of an air blast is convenient in regulating the amount of carbon in the iron produced and to obviate the effects of any excess of carbon due to careless charging. It is therefore convenient to provide twyers. Through these twyers reducing gases, such as producer gas, oil, etc., may be introduced where it is desirable to reduce the amount of solid carbon employed or do away with it altogether. The reactions above the bosh lines are the same as usual with this difference that the carbon monoxid (which plays an important part of the reactions of the blast furnace) is or may be exclusively supplied from the reduction of the iron ore and carbonates by carbon in lieu of being in part supplied by the interaction of air and carbon. An ordinary blast furnace with injected air may be regarded, in one way of looking at it, as a gas producer; as an apparatus in which injected air is converted into producer gas, that is a mixture of carbon monoxid coming from the oxygen of the air, with the nitrogen of the air, and this producer gas is relied upon to effect the reactions of the blast furnace. The gases coming from the head of the ordinary blast furnace have substantially the composition of ordinary producer gas with part of the carbon monoxid converted into carbon dioxid but containing the amount of nitrogen corresponding to the oxygen of the air used in forming the oxids of carbon. In the present invention the formation of producer gas from air does not occur except in so far as may be incident to the injection of a small amount of air and the gases passing away from the furnace are consequently poor in nitrogen and are comparatively rich in carbon monoxid. Upon reduction of contained carbon dioxid the effluent gas may be improved and converted into a gas of exceptional heating power. With or without reduction, it may be employed as a source of heat or power to aid in running the furnace. Pre-formed producer gas may, as stated, be blown into the furnace.

The electrodes may be as many as may be desired and may be fed from any desired source of heating current, this current being preferably alternating since no electrolytic action is desired. It may be derived from transformers fed by single phase or polyphase currents. The burden of the furnace may be as usual save that the amount of carbon is or may be very much cut down, merely that amount being used which is necessary for the chemical reactions on the charge in the reduction of the iron, and the supply of flux is similarly limited. As the burden reaches the point where the currents transversely cross the furnace, the iron is reduced and melted, and such slag forming bodies as may be present are converted into molten slag. The molten iron and molten slag drop below the bosh lines into a hearth whence they may be tapped in the usual manner. Since in the preferred form of this process as applied to smelting ores no substantial amount of air is admitted into the furnace, it is not necessary to provide a large amount of slag to shield the iron. The level of slag and iron layers may be reached at a point just below the bosh lines when any material passing the electrodes unchanged will build up until it is within the heating influence of the currents. In this method of operation, if the electrodes proper project inside the inner wall of the furnace they will be melted away until they come back to such wall, but they cannot retreat beyond it for the reason that under the influence of the water cooling, iron from the furnace will chill on the electrodes and solidify. In other words, the erosion and the building up soon come to an equilibrium and standstill. If the electrodes be originally set a little outside the inner face of the furnace wall they will build up by the formation of false electrodes or ends from the material reduced in the furnace. Should the building up of the false electrodes go beyond the furnace wall the shorter pathway offered for the current will lead to a greater development of heat with the result of fusing off the projecting portions. The length of the electrode as a matter of fact will depend on an equilibrium established between the heat within the furnace and the cooling influence of the water within the electrode. By a proper control of the circulation of water and other conditions the length of electrodes may be regulated as desired.

With a polyphase or multiphase current and a plurality of electrodes suitably arranged another and advantageous result may be attained in that the current may be made to pass both through the thickness of the charge and along the walls between the adjacent electrodes instead of merely following one line. This lateral passage tends to melt off accumulating matters and keep the wall and electrode ends clean. In smelting iron, a layer of iron may form on the wall between electrodes or the false electrodes extend laterally and this will form a short circuit resulting in an increase of lateral flow of current and a fusion of the accumulation. With this arrangement there is the further advantage that the temperatures in the smelting zone become more uniform. There is considerable difficulty in maintaining this uniformity of temperature, (and concomitant uniformity of operation) with either lateral or transverse heating singly. Lateral heating, as by the use of resistors, is in fact of little good for the present purposes while with purely transverse heating, as by the use of a pair of opposing electrodes, wall accretions tend to form. The heating effect comes mainly in the shortest path between the electrodes. With several electrodes and a polyphase current the heating effect is much better, apart from the results of the lateral passage of current between adjacent electrodes.

The current may be derived from step-down transformers fed from appropriate sources of alternating current. As the voltage of the current employed should be quite low, it is advantageous to have the leads as short as possible; and to this end the transformers may be located in a chamber beneath the furnace chamber.

The furnace is of the blast furnace type and in cross section may be circular in which event, with a polyphase current, the necessary number of electrode may be symmetrically arranged around its circumference; or it may be relatively long and narrow in one direction. For many purposes, a desirable type for large units is a shaft with a rectangular chamber longer in one direction than in the other. With a furnace of this type employing a triphase current the electrodes may be arranged in groups of six (three on a side) with each pair fed by its own transformer. The electrodes of each pair may be directly opposite or somewhat staggered. An interchange of current will occur between adjacent electrodes when this connection is used, since two transformers will be in series for a portion of each cycle, producing the described lateral passage of heating current and preventing accretions of chilled and unreduced ore or reduced material.

The walls of the hearth under the electrodes may be water cooled to prevent cutting away by slag or current. The walls between the electrodes may be similarly cooled. In using water cooling devices however care must be taken to avoid the possibility of short circuiting through the water mains and a portion of the feed conduit leading to or from any such device can advantageously include a length of rubber hose.

While as stated, a portion of air may be used in conjunction with the electrical heating it is ordinarily not desirable in smelting ores except in starting up, or when the charge contains too much carbon. A modicum of oil or reducing gas may be led into the furnace to assist the action of the carbon in smelting iron. In starting a furnace for reducing iron, the hearth and a portion of the shaft may be filled with coke or other fuel and a blast applied from the top or through suitable twyers until the furnace is heated up. After a time the regular charge is introduced. Current may be allowed to flow through the coke and assist in heating up.

With the nice regulation of thermal and chemical conditions possible in the present invention the character of the iron or steel produced may be easily controlled. In making iron or steel with a controlled carbon content, the charge should consist of ore with merely enough carbon to remove the oxygen and to leave the correct amount of carbon in the resulting metal. Merely enough flux, such as limestone, should be used to slag the impurities in the carbon and the ore. Where chrome iron is used the charge may similarly consist of chrome ore, iron ore, carbon and flux. Ferrovanadium, ferrotungsten, nickel alloy steel, etc., may be readily made in the same manner. Where ferrophosphorus or ferrosilicon is desired, a part of the charge should consist of minerals bearing the desired components of the ferrometal.

In smelting iron, as stated, the ordinary thermal and gas reactions go on within the furnace above the level of the smelting zone and combustible gas may be led away from the top of the furnace and used for any purpose desired, such as running gas engines which may furnish a portion of the current employed. The gas when made in the substantial absence of air is not contaminated with nitrogen and is therefore rich in carbon monoxid.

The foregoing method may be applied to the treatment of other ores and materials treated in shaft furnaces, as in smelting copper and lead, the production of matte, etc. All these materials will smelt in the same manner as in an ordinary furnace and will build up false electrodes in the same manner as that described for iron.

In smelting sulfid ores, and particularly where the production of a matte is desired, air should be admitted through the twyers to produce a reduction of the amount of sulfur present to the desired amount. The oxidation of the sulfur and of the metals thus produced of course generates heat and thereby reduces the heating duty imposed upon the current. In matte making it is not desirable to use any carbon in the charge. The current furnishes all necessary heat and conditions in the furnace may be maintained, oxidizing or reducing as desired without the local disturbances produced by the presence of bodies of carbon. With the independent control of the two necessary factors in matte making afforded by the electrical development of heat and the oxidation by the introduction of air, a much better control of conditions is afforded than where both heating and oxidation depend on the air blast. In matte making the same advantages accrue from the use of polyphase current as in smelting iron.

In the accompanying illustration I have shown, more or less diagrammatically, certain apparatus useful in performing the described process.

In this showing:—Figure 1 is a vertical section of a suitable furnace of cylindrical section, shown broken away. Fig. 2 is a view of the same in horizontal section along the lines x—x showing the connections diagrammatically. Fig. 3 is a horizontal section of a long and narrow shaft furnace; and Fig. 4 is a diagrammatic view of the connections.

In the showing of Fig. 1, element 1 is a shaft furnace shown broken away near its top, and provided with gas offtake 2. The furnace is provided with the usual charging means (not shown) by which charge 3 is continuously supplied and with boshes 4. In these boshes somewhat inset from the inner walls thereof are electrodes 5, shown as water cooled at 6. Under the influence of the heat of the current passing from the electrodes the inner ends tend to melt away, while, on the other hand, under the influence of the water cooling false ends or false electrodes 7 tend to form. The balance between the heating within the chamber and the cooling within the electrodes tends to preserve these false electrodes of a definite length. Below the electrodes the furnace is provided with the usual twyers 8 which may be fed, according to circumstances, with either air or combustible gas from a suitable source (not shown). Within the furnace is a hearth wherein the molten product 9 accumulates, carrying above it a layer of slag 10. Suitable tap holes are provided for the removal of the fused product and of the slag. The electrodes are fed by cables 11, deriving alternating current of high amperage and comparatively low voltage from a transformer 12 which is advantageously located in pit 13 below the furnace. This transformer is fed from a source of alternating or polyphase current 14.

In the showing of Fig. 2 the same furnace chamber is shown as provided with three electrodes fed from the diagrammatically shown transformer coils 15, one such transformer being located between each adjacent pair of electrodes. In Fig. 3, the arrangement is the same save that the furnace has been prolonged in one direction, giving a long and narrow chamber. As shown, the electrodes along the length of this chamber are grouped in groups of six, the arrangement being adapted to be fed from a triphase current. Each pair of electrodes is provided with its own transformer. In Fig. 4, the connections for this furnace are more clearly shown. Three wires, 16, 16ª and 16ᵇ carry a three phase current. Wires 18 and 19 are connected to winding 20 which produces a transformed current in winding 21, which as shown, has one connection with electrode 22 and another connection with opposite electrode 23. Wires 24 and 25 similarly connect another pair of the primary wires with winding 26, actuating 27, which is connected with electrodes 28 and 29. Leads 30 and 31 connect with winding 32, actuating winding 33, which is connected with electrodes 34 and 35.

What I claim is:—

1. In the smelting of ores, the process which comprises passing a charge comprising an oxidized ore and carbon downward through a vertical furnace chamber having a constricted portion and at the constricted portion passing a heating current transversely therethrough from a plurality of electrodes spaced away from the charge and arranged to allow the building up of false electrodes of limited length from products of the charge.

2. In the smelting of ores, the process which comprises passing heating currents transversely through a body of ore at a place of constriction from a plurality of electrodes connected to a source of polyphase current, such electrodes being spaced away from the charge and arranged to allow the building up of false electrodes of limited length from products of the charge.

3. In the manufacture of ferrometals, the process which comprises forming a charge comprising an oxidized iron ore and carbonaceous reducing material, passing such charge downward through a vertical furnace chamber having a constricted portion and passing a heating current transversely therethrough from a plurality of electrodes spaced away from the charge and arranged to allow the building up of false electrodes of limited length from reduced metal.

4. In the manufacture of ferrometals, the process which comprises forming a charge comprising an oxidized iron ore and carbonaceous reducing material, passing such charge downward through a vertical furnace chamber of the blast furnace type and having a constricted portion and passing heating currents therethrough from a plurality of electrodes connected to a source of polyphase current and out of direct contact with said charge.

5. In the manufacture of ferrometals, the process which comprises forming a charge comprising an iron ore and reducing material, passing such charge downward through a vertical furnace chamber having a constricted portion and passing heating currents therethrough from a plurality of electrodes connected to a source of polyphase current, such electrodes being arranged to allow the building up of false electrodes of limited length from products of the charge.

6. In the smelting of ores, the process which comprises passing a charge comprising such ore downward through a vertical shaft having a constriction and past a plurality of electrodes transmitting alternating current therethrough, said electrodes being water-cooled and arranged with their inner ends a little without the interior lines of the shaft.

7. In the smelting of ores, the process which comprises passing a charge comprising such ore downward through a vertical shaft having a constriction and past a plurality of electrodes transmitting polyphase currents therethrough, said electrodes being water-cooled and arranged with their inner ends a little without the interior lines of the shaft, said electrodes being so connected with the source of current that current may flow laterally between adjacent electrodes at appropriate times in the cycle.

8. In the smelting of iron ores, the process which comprises passing a charge comprising an iron ore vertically downward through a shaft furnace having a constricted portion, at the constricted portion passing a heating current therethrough and assisting in the reduction by the introduction of combustible matter through an appropriate twyer at a lower level.

9. In the smelting of iron ores, the process which comprises passing a charge comprising iron ore vertically downward through a shaft having a constriction and at the constriction passing a heating current transversely therethrough from cooled electrodes having inner ends a little without the line of downward passage of such charge.

10. In the smelting of ores, the process which comprises passing a charge comprising such ore downward through a shaft chamber having a constriction, passing alternating current transversely through such charge at the place of constriction to furnish heat and passing upward through such charge a limited amount of air to give a regulated oxidation.

11. In the smelting of iron, the process which comprises passing a charge comprising carbon and iron ore downward through a shaft chamber having a constriction, passing alternating current transversely through such charge at the place of constriction to furnish heat and regulating the content of carbon in the product by the introduction of controlled amounts of air through the charge.

12. In the smelting of iron, the process which comprises passing a charge comprising iron ore downward through a shaft chamber having a constriction, passing alternating current through such charge at the point of constriction and transmitting a reaction-supporting gas through such charge.

13. In an electric furnace, a shaft chamber having boshes, oppositely disposed cooled electrodes in said boshes but having their inner ends somewhat without the inner line of said boshes and a source of alternating current connected to said electrodes.

14. In an electric furnace, a shaft chamber having boshes, a plurality of symmetrically disposed cooled electrodes in said boshes but having their inner ends somewhat without the inner line of said boshes and a source of alternating current connected to said electrodes.

15. In an electric furnace, a shaft chamber having boshes, a twyer located below said boshes, oppositely disposed cooled electrodes in said boshes and a source of alternating current connected to said electrodes.

16. In an electric furnace, a shaft chamber having boshes, a twyer located below said boshes, a plurality of symmetrically disposed cooled electrodes in said boshes and a source of polyphase current connected to said electrodes.

17. In an electric furnace, a shaft chamber having boshes and of greater diameter in one direction than in another, a plurality of opposing cooled electrodes symmetrically disposed along said furnace and a source of polyphase current connected to said electrodes.

In testimony whereof, I affix my signature in the presence of witnesses.

RICHARD FLEMING.

Witnesses:
NEWTON T. CULLEN,
FREDERICK VICTOR LEHMANN.